June 9, 1964   M. G. SIRKS   3,136,974
METHOD FOR REMOVING ECHO EFFECTS FROM SEISMOGRAMS
Filed March 28, 1960

INVENTOR:
MARTINUS G. SIRKS
BY: *Theodore E. Bieber*
HIS ATTORNEY

INVENTOR:
MARTINUS G. SIRKS
BY: Theodore E. Bieler
HIS ATTORNEY

June 9, 1964   M. G. SIRKS   3,136,974
METHOD FOR REMOVING ECHO EFFECTS FROM SEISMOGRAMS
Filed March 28, 1960   4 Sheets-Sheet 3

INVENTOR:
MARTINUS G. SIRKS
BY Theodore E. Bieber
HIS ATTORNEY

United States Patent Office 3,136,974
Patented June 9, 1964

3,136,974
METHOD FOR REMOVING ECHO EFFECTS
FROM SEISMOGRAMS
Martinus G. Sirks, Delft, Netherlands, assignor to Shell Oil Company, New York, N.Y., a corporation of Delaware
Filed Mar. 28, 1960, Ser. No. 18,052
Claims priority, application Netherlands Apr. 3, 1959
2 Claims. (Cl. 340—15.5)

The invention relates to a method for the production of a seismogram starting from a seismic signal which either originates directly from artificially generated elastic vibrations or is derived from an existing seismogram.

As is known, in the seismic investigation of the soil artificial elastic vibrations may be generated in the soil to be investigated which are received by one or more detectors. Usually the detector, either a seismograph or geophone, converts the vibrations received into electric currents or voltages, and their amplitude, as a function of time, is then recorded as a seismogram.

The elastic vibrations are generally caused by exploding a charge or a number of charges fired either simultaneously or at short intervals. The charges may be placed in a borehole although surface charges may also be exploded. In examination of soil layers covered by a layer of water the charges are usually fired in the layer of water. The elastic vibrations may also be generated in other means, for example, by means of a falling weight or a vibration machine.

Generally a number of detectors, for example, 6, 12 or 24 are used, arranged in a certain way, for instance at equal distances from each other in a straight line some distance from the charge.

In the instance noted above in which seismic soil investigation is carried on from the surface of water, a cable containing detectors or to which detectors are attached, is towed behind a vessel. The charge or charges may be fired by the same cable or via a separate cable.

It is known to record the seismogram without suppressing certain frequencies or frequency bands in the signal originally recorded. Subsequently, the most interpretable diagram may be prepared in a central laboratory, from the seismogram originaly recorded, by means of various after treatments such as the introduction of electric high-pass filters, low-pass filters or band-pass filters, the distortion of scales, and other means.

It is also known to supply voltages or currents generated by the detectors, either immediately or after amplification, to a recording device via the above-mentioned electric filter chains.

The present invention may be used for the direct recording of a seismogram starting from a seismic signal derived from artificially generated elastic vibrations; preferably, however, the invention will be used as an after-treatment of a seismogram already recorded.

It has already been discovered that in carrying out seismic investigations from the water surface the seismogram can very often be rendered illegible by the presence of a continuous vibration occurring over large parts of the seismogram which shows a more or less constant frequency. Hitherto it was assumed that this vibration or echo effect was caused by a part of the energy generated by the exploding charge being drawn off by the water layer. The water layer was assumed to act as a wave conductor and to cause the said echo effects as a result of multiple reflection between the ground and the water surface.

It might have been expected that the echo effect would be eliminated by using a filter suppressing the frequency or frequency band of the echo effect, but it has been found that as a rule the use of such a filter does not appreciably improve the legibility of the seismogram.

Accordingly, the principal object of this invention is to provide a method for producing a seismogram in which auxiliary seismic signals are derived from an existing seismic signal, the auxiliary signals being shifted in time and phase and then combined with the original seismic signal in the proper intensity ratios to suppress the echo effects attributed to layers traversed by the original signal.

A further object of this invention is to provide a method for producing a seismogram using two auxiliary signals combined with the original seismic signal in which one of the auxiliary signals is shifted in time substantially twice the amount the other signal is shifted in time.

A further object of this invention is to provide a method for producing a seismogram using two auxiliary signals combined with the original seismic signal in which the ratio of the signals is substantially determined by the ratio $1:2r_1:r_1^2$ in which the value of $r_1$ is in the range of from 0 to 1.

A further object of this invention is to provide a method for producing a seismogram in which the echo effects occurring in the original seismic signal as a result of a plurality of adjacent layers traversed by the signal are suppressed through the use of auxiliary signals derived for each layer from the original seismic signal and then combined with the original signal at reduced amplitudes after being shifted in time and phase.

The invention is based on the discovery that the water layer and in general any layer causing echo effects; functions as a special kind of filter both directly for the artificially generated elastic vibrations, and indirectly for the elastic vibrations returning after reflection from deeper layers. By the use of the present method the effect of this filter is either reduced or eliminated.

According to the invention two auxiliary signals $H_{01}$, $H_{02}$ differently shifted in time and/or place are derived from the original signal $G_0$; the original signal and the auxiliary signals are combined and recorded in the desired intensity ratios; the said shifts and intensity ratios being so chosen that echo effects, which occur in the original signal, and whose occurrence may be attributed to the effect of a layer and in particular a water layer $L_1$ which the elastic vibrations have traversed, are substantially suppressed in the resultant seismogram ($G_1$).

The above and other objects and advantages of this invention will be more easily understood from the following detailed description of a preferred embodiment when taken in conjunction with the attached drawings in which.

Figure 1:
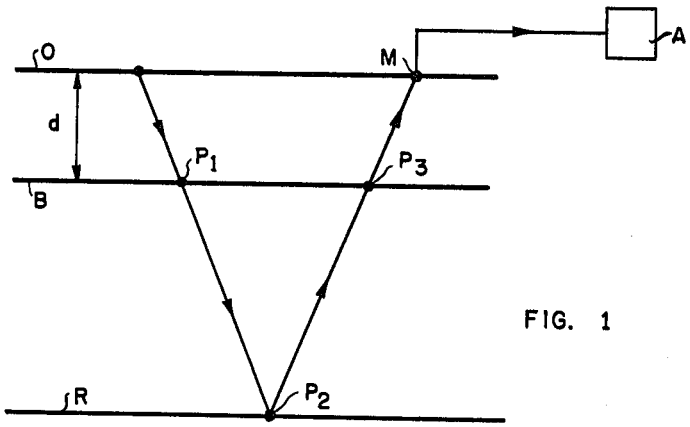
FIGURE 1 is a schematic drawing showing a seismic wave traveling from the surface and being reflected from a deeper layer.
Figure 2:
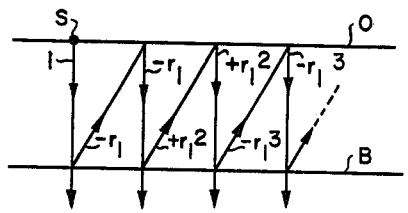
FIGURES 2 and 3 are schematic drawings showing the echo effects of a water layer on the seismic signal.
Figure 3:
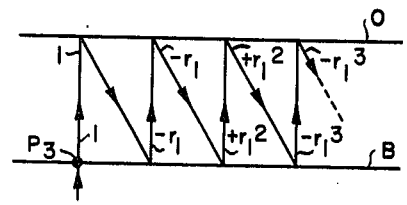

Referring now to FIGURES 1, 2 and 3, there is shown diagrammatically the case in which the seismogram is recorded from a water surface. O represents the surface of the water, B the ground and R a much deeper layer (the figure is not drawn to scale) at which elastic vibrations may be reflected. The elastic vibrations generated by a charge exploding at the point S are reflected from the layer R and received by a number of geophones. The geophones convert the received vibrations into an electric signal which after amplification is recorded. Only one of these geophones is shown at M. To avoid an unnecessarily complicated explanation, it is assumed that the exploding charge transmits a single elastic impulse and that the points A and M are both situated just under the water level. The invention, of course, has a much wider application.

The impulse generated in S traverses the water layer (thickness $d$ metres) at a speed of V m./sec. and then passes to M via $P_1$, $P_2$, $P_3$ and the water layer. In the recording equipment designated by A the vibrations received by M are recorded.

In practice it is found that the seismogram received by A shows echo effects which were hitherto attributed to a series of elastic impulses caused by various reflections between B and O. As observed earlier this explanation does not properly explain the echo effects observed, so that the steps taken on the basis of this explanation usually have little effect.

This invention is based on the discovery that the water layer exerts a considerable effect on the nature of the elastic vibrations penetrating the earth at $P_1$ and then reflected at $P_2$. A similar effect is also exerted by the water layer on the reflected vibrations entering the water layer at $P_3$ and finally received by the geophone M. These effects, to be discussed hereinafter, cause the echo phenomenon to render the seismogram obtained entirely worthless or as it is occasionally called, a "singing" record.

The invention provides a method of eliminating to at least a substantial degree the echo effect which occurs over large portions of and sometimes over the entire seismogram thereby rendering the point of arrival of the reflections often entirely unrecognizable and the seismogram illegible. In order to demonstrate in greater detail the measures taken according to the invention the effect of the water layer on the vibrations will first of all be examined.

In this connection it is observed that in practice the signal picked up by M will be recorded in the conventional manner; the recorded seismogram is then played back and the improved signal obtained through the use of this invention. The invention may, however, be directly applied at A when recording if desired.

FIGURES 2 and 3 show the effects exerted by the water layer on the elastic vibrations. FIGURE 2 shows diagrammatically what happens with the elastic impulse starting from S. The magnitude of this impulse is arbitrarily denoted by the value 1. When the impulse reaches the bottom a part of the elastic vibration energy enters the ground and a part is reflected; in this reflection there is a phase reversal when the bottom is a denser medium than water. As is usual, a positive value is given to the reflection coefficient $r_1$ occurring in the transition from elastic vibrations from a less dense to a denser medium. It is here assumed that the bottom is in fact a denser medium than water. The converse situation when the transition is to a less dense medium is discussed later.

It follows from the above that the impulse reflected on the bottom has the value $-r_1$. This impulse returns to the water surface and is there reflected with practically its full magnitude and without phase reversal as it is here reflected against a medium (air) which has a very low density compared to water. Thus a second impulse having an amplitude $-r_1$ passes from the water surface to the bottom. This impulse is, however, delayed over a period of $$\tau_1 = \frac{2d}{V}$$

as compared to the original impulse; the duration $\tau_1$ being the time which the elastic vibrations require to traverse twice the thickness of the water layer.

Similar considerations apply to the second impulse as to the original one. The result is that the original impulse leads to a series of impulses which viewed in time succeed each other with a time delay $\tau_1$; the amplitudes of these impulses decrease according to the series $$1, -r_1, +r_1^2, -r_1^3, \text{etc.}$$

In general the rule is that the $n$th impulse of the series leaves the water surface $n.\tau_1$ after the original impulse and has an amplitude of $(-r_1)^n$.

In the above discussion, the absorption of energy during its passage through the water layer is not taken into account. This absorption affects the relative strength of the impulses of the series insofar that the actual value of the impulses is smaller than that due to the reflection coefficient as such. The absorption is therefore shown as an apparent reduction in the reflection coefficient but for the time being, however, this effect will be ignored.

The elastic vibrations entering the bottom at $P_1$ also form a series of impulses. These impulses also have a time lag $\tau_1$ with respect to each other; their mutual amplitudes are in the ratio of $$1 : -r_1 : +r_1^2 : -r_1^3, \text{etc.}$$

Ultimately this also applies to the elastic vibrations arriving at $P_3$ after reflection on the layer R.

It will now be demonstrated with reference to FIGURE 3 what happens when a single impulse enters the water layer at $P_3$. From the discussion of FIGURE 2, it is not difficult to see that an impulse having an amplitude of 1 entering the water layer at $P_3$ leads to a series of impulses of which the successive individual impulses are each delayed over a period $\tau_1$ with respect to each other and have at the water surface a relative strength of $$1 : -r_1 : +r_1^2 : -r_1^3, \text{etc.}$$

These impulses are received by the geophone M and transmitted to the recording instruments A.

The elastic energy dissipated in the bottom on the return of the impulse to the bottom ($P_3$) is of no further interest. Owing to the total reflection at the air-water interface the geophone receives with double strength the impulse reflected at the water surface; since the doubling occurs with each impulse arriving and does not therefore modify the mutual relationship between the strength of the impulses it can also be ignored.

It follows from the above that what arrived at $P_3$ is not a single impulse but a series of associated impulses. Thus, after passing $P_3$, each of these impulses is converted into a series of impulses. The total result can be calculated by multiplication and addition. It is then found that a series of impulses is received at geophone M of which the relative magnitudes are in the ratio of $$1 : -2r_1 : 3r_1^2 : -4r_1^3, \text{etc.}$$

in which the various impulses succeed each other at intervals of $\tau_1$.

This result applies not only to a single impulse starting from S, but, of course, also to a more complex pattern $S(t)$ of elastic vibrations sent out by S. A complex pattern may in fact be considered as being built up from a plurality of impulses succeeding each other by the time $t$ and also to the reflections from a number of layers R. If therefore the entire seismic signal which would be received by the geophone in the course of the time as a result of $S(t)$, when there were no effect of the water layer, is represented by $G_1(t)$, then a signal $G_0(t)$ is actually received by the geophone in which $$G_0(t) = G_1(t) - 2r_1 . G_1(t-\tau_1) \\ + 3r_1^2 . G_1(t-2\tau_1) - 4r_1^3 . G_1(t-3\tau_1) + \text{etc.}$$

In order to remove from the signal $G_0(t)$ actually received the echo effects, this invention utilizes the above-described effects. Theoretically speaking, the effect of applying these measures is that the signal $G_1(t)$ is recorded instead of $G_0(t)$. In practice the echo effects will not usually be entirely removed, but a seismogram will be obtained which is far more suitable for seismic interpretation than the seismogram corresponding to the original signal $G_0(t)$.

In the present case of a single echo-generating layer, according to the invention two auxiliary signals $H_{01}(t)$ and $H_{02}(t)$ are derived from the received signal $G_0(t)$ which are shifted in time $\tau_1$ and $2\tau_1$ respectively. The signals $H_{01}(t)$ and $H_{02}(t)$ are $$H_{01}(t) = G_0(t-\tau_1) \text{ and } H_{02}(t) = G_0(t-2\tau_1)$$

The original signal and these auxiliary signals are added together in certain intensity ratios, for example $1:2r_1:r_1^2$, resulting in an improved signal theoretically corresponding to the desired signal $G_1(t)$:

$$G_1(t) = G_0(t) + 2r_1 H_{01}(t) + r_1^2 H_{02}(t)$$

By substituting the values of $H_{01}(t)$ and $H_{02}(t)$ it can be demonstrated that the latter equation corresponds to the above-mentioned formula for $G_0(t)$.

Hitherto reference has only been made to a shift in time, but in recording signals the time as a variable magnitude is usually converted to displacement as a variable magnitude. Hence, in a given method of recording a certain shift in position corresponds to a certain shift in time. If therefore reference is made to a shift in time this, according to circumstances, is equivalent to a shift in position.

Figure 4:
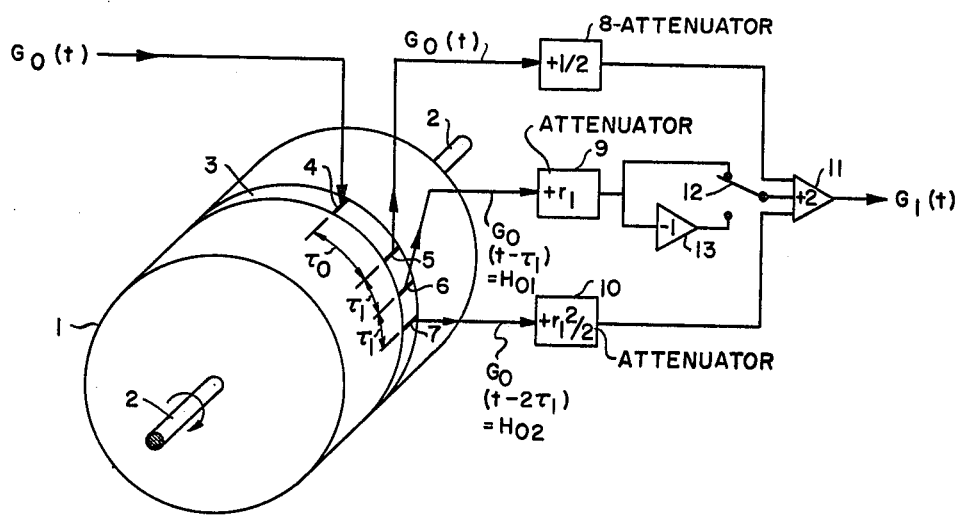
FIGURE 4 is a schematic drawing of a system for substantially suppressing the echo effects of the water layer.

Referring now to FIGURE 4, a drum 1 rotatably mounted on an axis 2—2 supports on the outside a magnetic band 3 which is suitable for the recording of the electric signal transmitted by the geophone M. The drum 1 is driven at a constant speed by any desired means not shown. A number of magnetic heads are fixed opposite the band 3 for recording the signal on the band and playing back the recorded signal. The recording head 4 records the signal from the geophone and three reproducing heads at 5, 6, and 7 pick up the recorded signal. The exact place of the heads 5, 6, and 7 can be adjusted relative to the recording head 4. For the sake of clarity the heads themselves are not shown but they may be any available commercial recording heads, for example magnetic type heads.

The distance between the recording head 4 and the first reproduction head 5 may be selected arbitrarily. There should be sufficient distance in the present case to prevent interference between the heads since magnetic heads inevitably have a spatial extension and head 5 cannot be located adjacent head 4. If $\tau_0$ represents the time required by a point on the magnetic band to cover the distance 4—5, the play back is not started until $\tau_0$ seconds after the commencement of the original signal is recorded at 4. This time lag $\tau_0$ occurs in all of the played-back signals 5, 6, and 7, and therefore only means that there is a shift from the zero point on the time axis in the case of these played-back signals. To avoid unnecessarily complicated formulae (actually the time variable should be denoted by $t'2t-\tau_0$ in the case of the further signals), the time variable will always be hereinafter designated by $t$; this actually corresponds to $\tau_0=0$. If the original signal is first entirely recorded and the play-back is carried out later, $\tau_0$ no longer appears and the first recording head can be used as pick-up head.

The distance between the heads 5 and 6 and 7 is of the same value, so that a point on the rotating magnetic band requires a time $\tau_1$ in order to move from 5 to 6 or from 6 to 7. This can be done by properly adjusting the location of the heads.

If the sismic signal $G_0(t)$ is now recorded on the band 3 at 4, it will be possible to produce the signals $G_0(t)$, $H_{01}(t) = G_0(t-\tau_1)$ and $H_{02}(t) = G_0(t-2\tau_1)$ at points 5, 6 and 7, respectively.

These signals should now be mixed in the ratio $1:2r_1:r_1^2$. This can be done in a great number of ways, one of which is shown in FIGURE 4.

The signal $G_0(t)$ is led through a circuit 8, thereby being multiplied by a factor $\frac{1}{2}$; the signal $H_{01}$ is multiplied by $r_1$ by circuit 9 and the signal $H_{02}$ by $r_{1/2}^2$ by circuit 10. The signals are then jointly led to an amplifier 11 having an amplification factor 2. The final result is the desired signal $G_1(t)$, which after recording produces the improved seismogram.

Since cases may arise in which $r_1$ has a negative value, a switch 12 is arranged between the circuit 9 and the amplifier 11 which when switched in its lowest position switches on an amplifier 13 having an amplification factor $-1$ (for example a cathode follower) in the circuit for $H_{01}$.

As stated, the three signals may also be mixed in the desired ratio in numerous other ways. The use of an amplifier 11 is unnecessary for example and the amplification factors of the circuits 8, 9 and 10 can be different provided the mutual ratios have the prescribed values, but the embodiment of the apparatus shown in FIGURE 4 corresponds exactly to the formula given.

In the apparatus according to FIGURE 4 the signal $G_0(t)$ is recorded on the magnetic band 3 via the recording head 4 in the form of the original recording of the seismic signal. When, however, the signal $G_0(t)$ has already been recorded elsewhere and the signal derived from the original recording is supplied at 4, it is then possible to rotate the drum 1 more rapidly than would be possible with an original recording of the signal, since in the latter case the entire seismogram has to be recorded over not more than one revolution of the drum; if a derived signal is supplied at 4 the seismogram may correspond to many revolutions of the drum. In this case an erasing head may then be arranged in front of recording head 4 which erases any signal still present on the band before a further part of the signal is recorded on the band at 4. The great advantage of the more rapid rotation of the drum is that the pick-up heads 5, 6 and 7 may be much more widely spaced for the same value of $\tau_1$. This is particularly important for small values of $\tau_1$.

If an existing magnetically recorded seismogram is attached to the drum in one piece, the recording head 4 may be entirely omitted; and it is possible to rotate rapidly.

As regards the magnetic recording itself, it should be observed that the seismic signal is usually recorded on the band by means of frequency modulation. As this technique is well known, for the sake of simplicity the modulators and demodulators are not shown.

The signal $G_1(t)$ may be recorded in any manner desired, for example magnetically or photographically. The echo effects introduced by the water layer have now been substantially eliminated from the resultant seismogram, so that this diagram is suitable or more suitable for seismic interpretation.

The value of $\tau_1$ may be calculated from the known or measured values of the depth of the water $d$ and the rate of propagation $V$; this value is, however, preferably determined by measuring the vibration time or frequency of the echo effects in the original signal.

The absolute value of $r_1$ varies between 0 and 1; this value can be estimated if the condition of the bottom is known. $r_1$ may also be determined by separate experiments, e.g., model experiments and sometimes the results are available from measurements made in an already existing borehole of the propagation velocity of elastic vibrations as a function of depth.

When using these values for $\tau_1$ and $r_1$ it should be remembered that the theoretical picture outlined above is only an idealized case which may differ substantially from reality. Thus, at all points, the water is not equally deep nor is the rate of propagation the same nor the transition from water to the bottom. It may also be the case that the transition is not sharply defined, for example owing to the presence of plants, mud, and other debris so that the resultant absorption of the layer as discussed above results in the value used for $r_1$ no longer entirely corresponding to the actual value of the reflection coefficient. In practice, therefore, the actual values for $\tau_1$ and $r_1$ involved only approximately correspond to the theoretical values.

It is therefore occasionally necessary to follow in practice a procedure in which the improved seismogram is made for a number of values of $\tau_1$ and $r_1$, and from these improved seismograms the best is selected for the subsequent interpretation. Since the value of $\tau_1$ can be more accurately determined than that of $r_1$, an improvement is first made in the seismogram, starting from a specific value of $\tau_1$. This improvement is made for a number of probable values of $r_1$. The value of $r_1$ which leads to the most legible seismogram is then adhered to as being the correct one.

The value of $r_1$ has been hitherto regarded as positive (transition from water to a hard bottom); if, however, there is a layer of mud on the bottom it may be necessary to substitute a negative value for $r_1$. There is no change in the derived formulae, but in this case the connection between 6 and 11 in FIGURE 4 should insure multiplication by a negative coefficient. For this purpose use is made of the combination of the circuit 9 and the phase reversal stage 13, which is inserted by reversing the switch 12. Although in practice this is the simplest method of multiplying by a positive or negative value of $r_1$, it is of course also possible to employ two entirely different circuits 9 and one not shown between 6 and 11, one of which is intended for multiplying by positive and the other by negative values of $r_1$.

From the relationship existing between the vibration time $\tau$ of the echo effect, the depth of water $d$ and the rate of propagation V, viz.

$$\frac{2d}{V} = n \cdot \frac{\tau}{2}$$

(in which $n$ is any integer which is uneven when $r_1 > 0$ and even when $r_1 < 0$)

it is usually possible to obtain a direct indication whether $r_1$ is positive or negative when $d$, V and $\tau$ are known.

Figure 5:
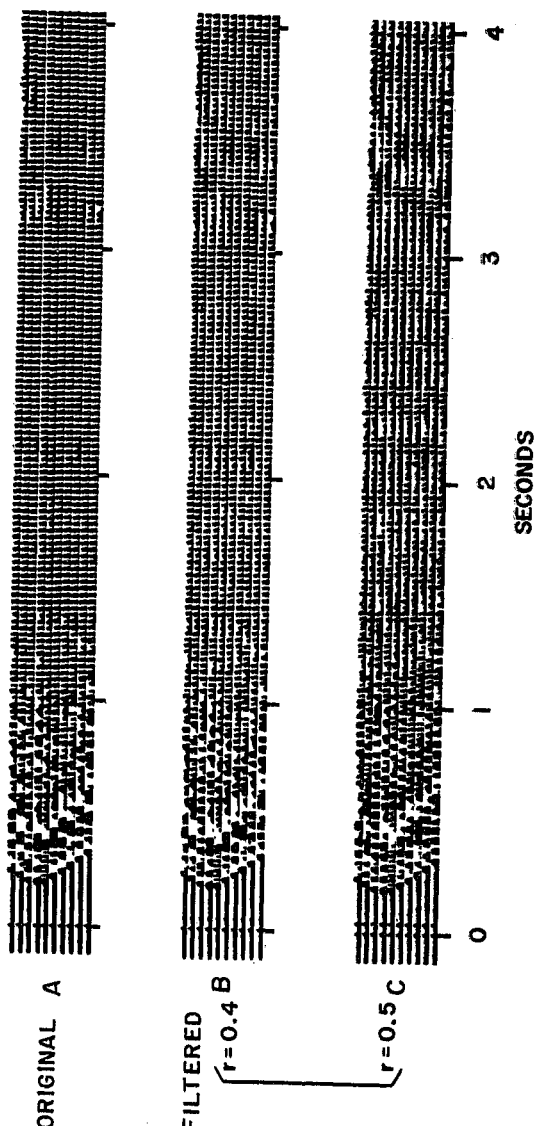
FIGURE 5 illustrates the improvement in a seismogram resulting from the use of this invention.

The result of the improvement obtainable with the present method is clearly shown in FIGURE 5 in which an originally recorded seismogram and two improved seismograms are shown side by side, each consisting of 10 single seismograms derived from 10 geophones; each single seismogram being separately improved through the use of this invention.

The original seismograms A were recorded in the Persian Gulf; the water was about 34 metres deep and the bottom consisted of hard limestone. The velocity of the elastic vibrations in sea water is about 1525 metres per second. It can readily be seen that the seismogram is illegible and scarcely gives any useful indication. From this diagram an improved seismogram was subsequently derived in two different ways by the method described, vis., seismogram B with $r_1 = +0.4$ and seismogram C with $r_1 = +0.5$. Both improved diagrams show a large number of details which cannot be read from the original diagram.

The diagrams B and C also show that the value of $r_1$ used in the method is not critical. This is also found to be the case in general; usually there is a region within which $r_1$ may vary but in which a considerable improvement is obtained in the seismogram. Similar observations often apply to the magnitude $\tau_1$.

Seismograms were recorded in the lake of Maracaibo which showed strong echo effects as a result of which the presence of reflections in the diagrams could not be recognized, or as a result of which at least the correct time of arrival of the reflections could not be determined. The water was about 28.5 metres in depth; there was a layer of hard mud on the bottom. With the use of the present method ($r_1$: $-0.4$ and $-0.5$; $d$: about 29–33.5 metres; $\tau$ was found to be about 42 milliseconds). Very useful diagrams were obtained from which it was easily possible to determine the presence of reflections and the exact time of arrival of these reflections.

The invention has been described with relation to echo effects caused by the presence of a layer of water. Under certain conditions these effects may also be caused by other layers, for example the weathering layers at a greater depth in the ground. The echo effects caused by these layers may be eliminated in the same way as indicated above for a water layer.

In the general case of any layer $L_1$ the reflection coefficient $r_0$ for elastic vibrations measured at the top of the layer $L_1$ should also be taken into account. This coefficient is defined (in a manner similar to $r_1$) for vibrations trying to penetrate into the layer $L_1$ from above. In the general case the formulae for $H_{01}$ and $H_{02}$ assume the form:

$$H_{01}(t) = r_0 G_0(t - \tau_1) \text{ and } H_{02}(t) = r_0^2 G_0(t - 2\tau_1)$$

In the case of a layer of water ($r_0 = 1$) these formulae change into the simpler formulae referred to above.

In cases in which $r_0$ differs from 1, care should therefore be taken to insure that during or after the play-back, see above description, via the heads 6 and 7 there is a multiplication by $r_0$, and $r_0^2$, respectively. In general it is desirable to keep the change in intensity (by factor $r_0$ and $r_0^2$, respectively) separate from the play-back in order to obtain the shift over the values $\tau_1$ and $2\tau_1$, respectively, although in principle these measures may be combined by adjusting the magnetic heads 6 and 7 in a different manner (for example at different distances) on the band 3.

The multiplication of $G_0(t - \tau_1)$ or $G_0(t - 2\tau_1)$ by $r_0$ and $r_0^2$ respectively, may also be combined with the subsequent multiplication by $r_1$ and $r_1^2$ respectively. In this case, in fact, instead of the absolute value of the reflection coefficient at the bottom of the layer, the absolute value of the product of the reflection coefficients for the elastic vibrations at the top and the bottom of the layer is used.

In addition to the above cases the echo effects may also be caused by more than one layer. These echo effects may be reduced or eliminated by proceeding according to the invention. In this case it is necessary to distinguish whether or not the layers are coupled; this will be explained more clearly with reference to the case in which two such layers occur. Should the two layers adjoin there are not only echo effects originating from each layer separately but disturbing echo effects may possibly also be caused by the combination of these layers as a whole. If, however, the two layers do not adjoin and are sufficiently far apart, only the echo effects of each separate layer will occur.

It should be observed that it is only necessary to suppress disturbing echo effects in the frequency range of about 10 to about 300 cycles per second in order to improve most seismograms.

It follows from the above that thicker layers will give rise to echo effects having a lower fundamental frequency, and thinner layers to effects having a higher fundamental frequency. In the case of very thin layers the fundamental frequency of the disturbing effect will lie outside the specified region. In the case of very thick layers the fundamental frequency of the disturbance will fall below the region although it is occasionally possible for the higher harmonics to give rise to a disturbing effect. Combinations of very thin layers which are wide apart will not generally give rise to echoes within the specified frequency range.

In order to determine the correct moment of arrival of the reflection at a given layer it is usually necessary to correct the seismogram only for echo effects from layers above this layer. Hence, it may happen that in the case of reflections recorded at the beginning of a seismogram as in the case of shallow reflections corrections for a single layer is adequate. In the case of deeper reflections it may be desirable to make a correction for more than one disturbing layer if more disturbing layers are present above the deeper reflecting layer.

In the case of non-coupled layers the echo effects of the first and second layer can be successively eliminated by repeated use of the present method.

In the first instance the recorded signal is corrected in the manner described with the reflection coefficient $r_1$ and a time shift $\tau_1$, having magnitudes which relate to the first layer. The diagram thus corrected and recorded is then again treated in the same manner, but now with the reflection coefficients $r_2$ and a time-lag $\tau_2$ having magnitudes which relate to the second layer. The values of $r_2$ and $\tau_2$ are determined or assumed in the same manner as the values of $r_1$ and $\tau_1$. The values of $\tau_1$ and $\tau_2$ can occasionally be found from a Fourier analysis of the original seismogram and $\tau_2$ can occasionally be measured from the seismogram as corrected for $\tau_1$. In the general case the reflection coefficient at the top of the second layer should now also be taken into account. For correction in connection with the second and additional layers the general formulae for the auxiliary signals will be used. The use of these more generally applicable formulae amounts to substituting the product of the reflection coefficients at the top and bottom of the layer, wherein the simpler case of a water layer only the reflection coefficient at the bottom was used. This simple method cannot, however, be adhered to when there are a number of layers coupled together, since in this case the reflection coefficient at the top of the combined layers does not follow the general formulae. Where there are more than two uncoupled layers the procedure is similar for each layer; thus for $n$ layers the method is repeated $n$ times.

If it is desired to improve the seismogram for two non-adjacent layers which are sufficiently far apart it is possible to adopt the procedure described above. This situation may, however, also be regarded as the case of three coupled layers and corrected in the manner to be described hereinafter for a number of coupled layers. If, however, the disturbing layers are sufficiently far apart it will be possible to observe that the following more complicated procedure gives no better results than the use of the above method for a plurality of non-coupled layers.

In the case of two adjacent or coupled layers the situation is more complex. In this case two auxiliary signals $H_{11}(t)$ and $H_{12}(t)$ should be derived in addition to the improved signal $G_1(t)$ relating to the first layer:

$$G_1(t) = G_0(t) + 2r_1.H_{01}(t) + R_1^2.H_{02}(t)$$
$$H_{11}(t) = R_1G_0(t) + (1+r_1^2).H_{01}(t) + r_1.H_{02}(t)$$
$$H_{12}(t) = r_1^2.G_0(t) + 2r_1.H_{01}(t) + H_{02}(t)$$

In the case of $H_{01}(t)$ and $H_{02}(t)$ the general formula mentioned previously should be used. The auxiliary signals $H_{11}(t)$ and $H_{12}(t)$ are obtained from $G_0(t), H_{01}(t)$ and $H_{02}(t)$ in the same manner as $G_1(t)$ described above with only the multiplying factor of circuits 8, 9 and 10 being changed. The signal $G_2(t)$ which is also improved with relation to the second layer, is now obtained by means of the signals $G_1(t)$, $H_{11}(t)$ and $H_{12}(t)$. The signal $G_2(t)$ then becomes:

$$G_2(t) = G_1(t) + 2r_2.H_{11}(t-\tau_2) + r_2^2H_{12}(t-2\tau_2)$$

Figure 6:
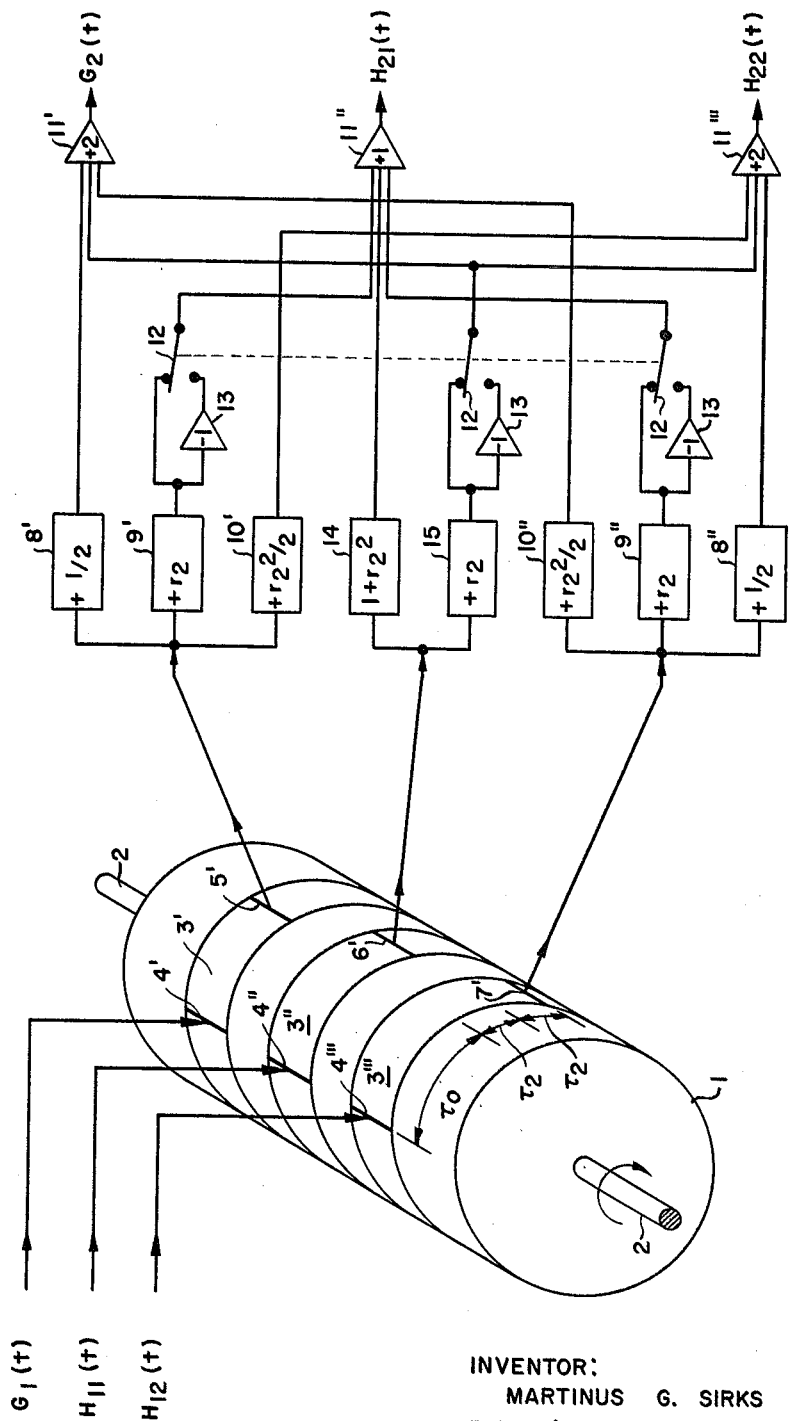
FIGURE 6 is a schematic drawing of a system for substantially suppressing the echo effects of two layers; and, FIGURE 7 is a schematic drawing of a complete system for substantially suppressing the echo effects of two or more layers.

FIGURE 6 shows digrammatically an apparatus by means of which $G_2(t)$ can be derived starting from $G_1(t), H_{11}(t)$ and $H_{12}(t)$. This apparatus also has a drum 1 rotatably arranged about an axis 2—2. In the present instance, however, three parallel bands 3′, 3″ and 3‴ are arranged on the outside (a single wide magnetic band may also be used for three parallel tracks), on which the signals $G_1(t)$, $H_{11}(t)$ and $H_{12}(t)$ can be recorded by means of the magnetic heads at 4′, 4″ and 4‴. The reproducing heads, arranged at intervals of $\tau_2$, are present at 5′, 6′ and 7′.

The signals taken up at 5′, 6′ and 7′ are now led to the circuits 8′, 9′ and 10′, to the circuits 14 and 15 and to the circuits 8″, 9″ and 10″, respectively. After passing the amplifier 11′ having an amplify factor 2 the sum of the signals derived from 8′, 15 and 10″ gives the required signal $G_2(t)$ which is corrected for the two coupled layers. The connection 8′, 15 and 10″ multiply the incoming signals by the factors ½, $r_2$ and $R_{2/2}^2$ respectively. Otherwise the apparatus operates in exactly the same manner as that according to FIGURE 4.

The apparatus according to FIGURE 6 also affords the possibility of deriving two further auxiliary signals $H_{21}(t)$ and $H_{22}(t)$ which can be used together with $G_2(t)$ for correcting a third adjacent or coupled layer in a similar manner. In this case:

$$H_{21}(t) = r_2.G_1(t) + (1+r_2^2)H_{11}(t-\tau_2) - r_2H_{12}(t-2\tau_2)$$
$$H_{22}(t) = r_2^2G_1(t) + 2r_2H_{11}(t-\tau_2) + H_{12}(t-2\tau_2)$$

The corrected signal $G_3(t)$ for the three coupled layers then becomes:

$$G_3(t) = G_2(t) + 2r_3.H_{21}(t-\tau_3) + r_3^2H_{22}(t-2\tau_3)$$

To this end the signals $G_2(t), H_{21}(t-\tau_3)$ and $H_{22}(t-2\tau_3)$ should be summed in the relative strength $1:2r_3:r_3^2$, the reflection coefficient $r_3$ and the time shift $\tau_3$ being associated with the third layer. The time shifts $\tau_3$ and $2\tau_3$, the various multiplactions and the combining functions are carried out in a similar manner to that indicated for $G_2(t)$. By a similar extension of the method it is possible in principle to make a correction for $n$ coupled layers. With the apparatus according to FIGURE 6, starting from $$G_{n-1}(t), H_{n-1,1}(t) \text{ and } H_{n-1,2}(t)$$

it is then possible to derive the magnitudes $G_n(t)$, $H_{n,1}(t)$ and $H_{n,2}(t)$, thereby correcting for the $n$ layer with $r_n$ as reflection coefficient and $\tau_n$ as time shift associated with the $n$th layer.

The case of a number of coupled layers may occur, for example, in a weathering layer made up of a number of separate, adjacent layers, in which the elastic vibrations are propagated at varying velocities. Thus, for example, a weathering layer was encountered which consisted of three layers as follows: 1 metre ground+air, 3 metres ground+water and 3.5 metres of peat layer; velocities 170 metres per second, 1000 metres per second and 400 metres per second.

The circuits 9′, 10′, 14, 8″ and 9″ multiply respectively with the factors $r_2$, $r_{2/2}^2$, $(1+r_2^2)$, ½ and $r_2$. The amplifiers 13 have an amplification factor of $-1$ and are used when $r_2$ must have a negative value; the amplifiers 11′, 11″ and 11‴ respectively have amplification factors of 2, 1 and 2.

The multiplications and additions performed by the apparatus in FIGURE 6 may also be done in othed ways provided the final result in the same . Otherwise the embodiment given closely corresponds to the formulae given above.

Figure 7:
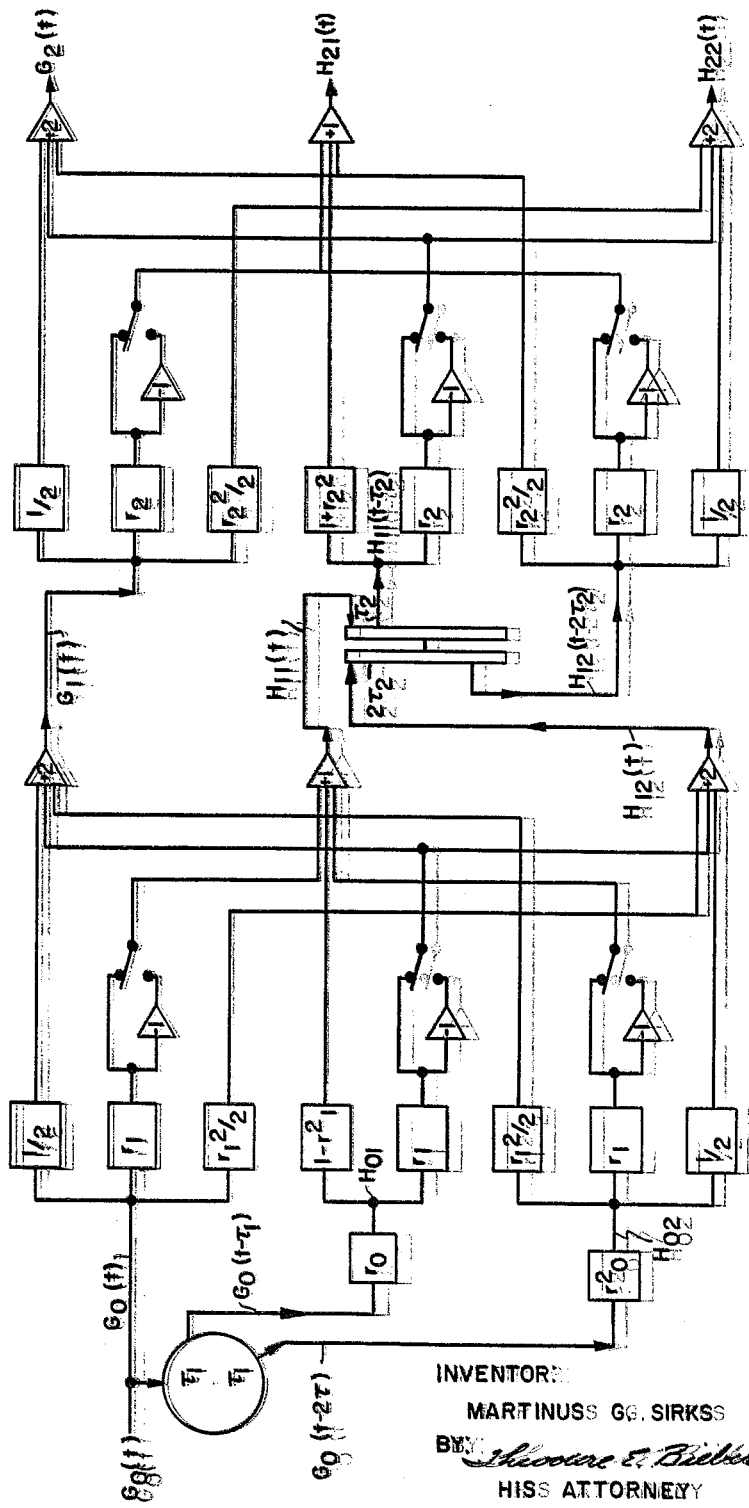

FIGURE 7 also gives a diagrammatical view of the entire apparatus required for making the seismogram $G_2(t)$ starting from $G_0(t)$ and thus is a combination of FIGURES 4 and 6. The apparatus is shown in a somewhat simplified form, the signals $G_0(t)$ and $G_1(t)$ being immediately coupled to the next stage without recording, thus eliminating one reproducing head in the first stage and one magnetic band in the second stage.

The apparatus according to FIGURES 4, 6 and 7 operate by means of magnetic recording and reproduction, this is not essential, however, for the method according to the invention may be performed by other equipment. In principle, in order to make a seismogram which is corrected for the effect of a single layer or a number of non-coupled layers any apparatus may be used which can produce from a given signal auxiliary signals shifted in time and/or place, and by means of which the given signal and the auxiliary signals may be combined and recorded in the desired intensity ratios. Should it be necessary to apply a correction for two or more coupled layers the apparatus should be capable of producing auxiliary signals shifted in time and/or place, starting from a number of given signals, while it should further be possible to combine and record the relevant signals in the desired intensity ratios.

Each apparatus should be equipped with a memory element so that the information present in a given signal may be stored therein or becomes stored therein. It may be that at a given moment, the entire signal has not been stored in the memory, but only a portion thereof, which is sufficient for carrying out the shift in time and/or place. In carrying out the method the stored portion continually changes in such a way that during the process the entire signal passes through the memory element. It follows from the foregoing that an apparatus according to the invention may have more than one memory element to effect a combined correction. The apparatus should also contain at least one reproducing element which can derive from the memory element information corresponding to the original information, but shifted in time and/or place. Finally there should be at least one recording element which is capable of combining and recording a number of data in the prescribed intensity ratios.

It may happen that the various elements together perform the described functions so that no sharp distinction can be drawn between these elements. The original signal (or the derived signals) may, for example, be optically recorded in a variable area or a variable density diagram. The play-back can be effected by means of one or more light sources, optical image-reproducing systems, photo cells and optical filters (e.g., slits of which the height may be adjusted if necessary). In this case the film with the photographically recorded signal may occupy the place of the band 3 in FIGURE 4. A light source may be arranged inside the drum (which should be transparent at the place of the film) and narrow light-transmissive slits may be fixed at points occupied by pick-ups 5, 6 and 7 with the photo cells mounted behind the slits. Each photo cell receives only the light which has passed through the corresponding slit. If in the case of the layer of water the heights of the three slits are in the ratio of $1:2r_1:r_1^2$, the output signals can be directly summed (usually after amplification via a photo-electric multiplier, for example).

The summation may also be optically carried out by causing the amounts of light from slits at the points occupied by pick-ups 5, 6 and 7 to influence a single photo cell. If $r_1$ has a negative value the sum of the light transmitted by the slits corresponding to the pick-ups 5 and 7 should be reduced by the slit corresponding to pick-up 6. To this end, however, the light from the slit corresponding to pick-up 6 should be separately converted into an electric signal via a separate photo cell. The light from the slits corresponding to the pick-ups 5 and 6 can also be converted to electric signals of the other slit and then be reduced by the electric signal.

It is also possible to work with an opaque photographic recording of the signal $G_0(t)$ instead of the above-mentioned transparent film; in this case the operation is carried out with incident light and the reflected light is led to one or more photo cells. The optical system to be used and/or required for forming images of light sources, photo cells and slits, as well as for obtaining a uniform illumination (for example, at the point of the photographic recording and/or the slits), is omitted here for the sake of simplicity, many systems being known to those skilled in the seismic art.

Another simple method, although not a preferred one when rapid work is required, consists in photographically printing a film with variable density recording on a photographically-sensitive paper. This printing procedure is applied to the same paper three times in all, the film moving lengthwise over a small distance with respect to the photo-sensitive paper. This shift in place corresponds to the above-mentioned shift in time $\tau_1$ (or as the case may be $\tau_2$, etc.). The illumination in each printing procedure is selected to correspond to the desired intensity ratios of signal and auxiliary signals when correcting for a single layer or a number of non-coupled layers. When illuminating it is assumed that the operation is carried out in a linear or a substantially linear part of the optical-density curve of the photographically-sensitive paper. The final print then forms the recorded sum of the various signals.

Still another system which may be used is one utilizing electrical delay lines for deriving time delayed signals from a given signal. With the use of such lines, however, it is usually necessary to reproduce the given signal and to transmit it to the electric circuit in a shorter time than it naturally has, otherwise the circuitry may become very voluminous and costly.

It will be clear that in the present method various means and systems known in the art may be used either directly during the recording or subsequently when making the definitive seismogram in order to improve the legibility of the seismogram by substantially eliminating echoes caused by layers disposed below the shot point.

I claim as my invention:

1. A method for producing a seismogram in which the echo effects of two or more layers are substantially reduced comprising: generating a first pair of auxiliary signals from the original seismic signal, said first pair of auxiliary signals being shifted in time with respect to the original signal; adjusting the magnitudes of the first pair of auxiliary signals to different values related to the reflection coefficient of one of the layers; generating a second pair of auxiliary signals from said first pair of auxiliary signals, said second pair of auxiliary signals being shifted in time with respect to the first pair of auxiliary signals; adjusting the magnitudes of the second pair of auxiliary signals to different values related to the reflection coefficient of the other of said layers and then combining said second pairs of auxiliary signals with said original seismic signal.

2. The method of claim 1 in which the time shift of the first pair of auxiliary signals is related to the travel time of elastic vibrations from a source to the first layer and return and the time shift of the second pair of auxiliary signals is related to the travel time of elastic vibrations from said source to the second layer and return.

References Cited in the file of this patent

UNITED STATES PATENTS

| | | |
|---|---|---|
| 2,794,965 | Yost | June 4, 1957 |
| 2,882,988 | Dobrin | Apr. 21, 1959 |
| 2,916,724 | Peterson | Dec. 8, 1959 |
| 2,956,261 | Grossling | Oct. 11, 1960 |